(12) United States Patent
Chapuis-Desplanques et al.

(10) Patent No.: US 11,796,033 B2
(45) Date of Patent: Oct. 24, 2023

(54) COMPACT VIBRATION DAMPING DEVICE AND VEHICLE

(71) Applicant: AIRBUS HELICOPTERS, Marignane (FR)

(72) Inventors: Anne-Claire Chapuis-Desplanques, Saint-Chamas (FR); Thibaut Rouchon, Coudoux (FR); Thomas Manfredotti, La Colle sur Loup (FR)

(73) Assignee: AIRBUS HELICOPTERS, Marignane (FR)

( * ) Notice: Subject to any disclaimer, the term of this patent is extended or adjusted under 35 U.S.C. 154(b) by 1006 days.

(21) Appl. No.: 16/661,341

(22) Filed: Oct. 23, 2019

(65) Prior Publication Data

US 2020/0132159 A1 Apr. 30, 2020

(30) Foreign Application Priority Data

Oct. 26, 2018 (FR) ..................................... 1801133

(51) Int. Cl.
| | |
|---|---|
| *F16F 15/129* | (2006.01) |
| *B64C 27/00* | (2006.01) |
| *F16F 15/34* | (2006.01) |

(52) U.S. Cl.
CPC ........ *F16F 15/1295* (2013.01); *B64C 27/001* (2013.01); *F16F 15/34* (2013.01)

(58) Field of Classification Search
CPC ...... F16F 15/34; F16F 15/1295; B64C 27/001
See application file for complete search history.

(56) References Cited

U.S. PATENT DOCUMENTS

| | | | |
|---|---|---|---|
| 5,365,710 A | 11/1994 | Randjelovic | |
| 5,572,842 A | 11/1996 | Stief et al. | |
| 6,145,785 A | 11/2000 | Certain | |
| 6,325,327 B1 | 12/2001 | Zoppitelli et al. | |
| 8,636,121 B2 | 1/2014 | Manfredotti et al. | |
| 2005/0165515 A1* | 7/2005 | Aubourg | G05B 5/01 244/17.11 |

(Continued)

FOREIGN PATENT DOCUMENTS

| | | |
|---|---|---|
| CA | 2914212 A1 | 12/2016 |
| CN | 105972370 A | 9/2016 |

(Continued)

OTHER PUBLICATIONS

Korean Office Action dated Oct. 14, 2020 (with English Translation), Application No. 10-2019-0133696, Applicant Airbus Helicopters, 5 Pages.

(Continued)

*Primary Examiner* — Vishal R Sahni
(74) *Attorney, Agent, or Firm* — Brooks Kushman P.C.

(57) ABSTRACT

A vibration damping device equipped with a resonator mechanism comprising at least one resonator, the at least one resonator having a first beater extending from an embedded end to a free beating end. The resonator consists of an elastically deformable base equipped with a first branch and a second branch connected by a central section, the embedded end being embedded at the first branch, the first branch extending from a first end to a second end each rigidly fastened to a mount, the second branch extending from a first end section to a second end section each rigidly fastened to a vibration source.

20 Claims, 4 Drawing Sheets

(56) References Cited

U.S. PATENT DOCUMENTS

| | | | |
|---|---|---|---|
| 2011/0097193 A1 | 4/2011 | Manfredotti | |
| 2011/0268573 A1* | 11/2011 | Girard | B64C 27/001 |
| | | | 416/145 |
| 2016/0264236 A1* | 9/2016 | Hocquette | B64C 27/001 |
| 2017/0037927 A1* | 2/2017 | Buesing | F16F 15/06 |
| 2018/0265187 A1* | 9/2018 | Jouve | B64C 27/001 |

FOREIGN PATENT DOCUMENTS

| | | | | |
|---|---|---|---|---|
| DE | 102010021867 A1 * | 12/2011 | | B06B 1/0603 |
| EP | 0705950 A1 | 4/1996 | | |
| FR | 2777860 A1 | 10/1999 | | |
| FR | 2795386 A1 * | 12/2000 | | B64C 27/001 |
| FR | 2795386 A1 | 12/2000 | | |
| FR | 2951698 A1 | 4/2011 | | |
| FR | 2951700 A1 | 4/2011 | | |
| FR | 3033543 A1 | 9/2016 | | |

OTHER PUBLICATIONS

French Search Report for French Application No. FR 1801133, Completed by the French Patent Office, dated Jul. 25, 2019, 14 pages.

U.S. Pat. No. 5,572,842 A is being cited because that document is related to EP 0705950 A1.

U.S. Pat. No. 6,145,785 Ais being cited because that documant is related to FR 2777860 A1.

U.S. Pat. No. 6,325,327 B1 is being cited because that document is related to FR 2795386 A1.

U.S. Publication No. 20110097193 A1 is being cited because that document is related to FR 2951698 A1.

U.S. Pat. No. 8,636,121 B2 is being cited because that document is related to FR 2951700 A1.

U.S. Publication No. 20160264236 A1 is being cited because that document is related to FR 3033543 A1.

* cited by examiner

COMPACT VIBRATION DAMPING DEVICE AND VEHICLE

CROSS-REFERENCE TO RELATED APPLICATIONS

This application claims priority to French patent application No. FR 1801133 filed on Oct. 26, 2018, the disclosure of which is incorporated in its entirety by reference herein.

BACKGROUND OF THE INVENTION

(1) Field of the Invention

This invention relates to a compact vibration damping device and to a vehicle equipped with such a vibration damping device. For example, this vehicle may be an aircraft, including but not limited to a rotary-wing aircraft, e.g., a helicopter.

This invention is thus within the field of vibration damping mechanisms, including mechanisms to reduce vibrations occurring on an aircraft in general and on a rotary-wing aircraft in particular.

(2) Description of Related Art

In the case of a rotary-wing aircraft, the passengers and aircraft equipment are subjected to vibrations generated by the various rotors and mechanical assemblies of the aircraft. On a helicopter in particular, noticeable vibrations occur at a primary frequency equal to the product of the number of blades on the main rotor and the rotation frequency of this main rotor.

To optimize the comfort of the passengers in the aircraft as well as the lifetime or operation of the aircraft equipment, this aircraft may comprise multiple systems to at least mitigate the vibrations sustained, especially the vibrations produced at the above-mentioned primary frequency.

For this purpose, a rotary-wing aircraft may comprise various systems interfacing between a vibration source and a body to be isolated from vibrations, such as mass bodies arranged in the blades or resonators forming systems known by the brand name "SARIB®".

Document FR 3033543 describes such a resonator for suspension bars.

In addition, an aircraft cabin may comprise active systems known as "AVCS", pad systems, or passive vibration damping devices.

For example, each seat may be equipped with a passive vibration damping device that is mechanically interposed between a floor and the seating surface. For example, a passive vibration damping device for seats may include one or more resonators.

Document FR 2951700 describes a passive vibration damping device equipped with a pair of vibration-filtering bodies arranged in an inverse parallel configuration. Each filtration body is articulated by two pivots to a floor and by two pivots to a seat. The pivots take up a non-negligible amount of space of around several centimeters.

This is an efficient mechanism. However, a passenger sitting on the seat places his feet on the floor and can then feel vibration through his feet. The passenger may thus feel some discomfort. To remedy this, a foot-board can be attached to the seat or to the vibration damping device, but such an assembly may be difficult to obtain. Alternatively, it is possible to suspend the floor from devices of the type disclosed in document FR 2951700, but the presence of the pivots would involve raising the floor by several centimeters.

An active system such as AVCS has the advantage of mitigating vibration throughout the entire cabin. However, it is difficult to adjust such system to obtain significant vibration damping, for example at a passenger's feet, while achieving optimal performance in the rest of the cabin. This kind of active AVCS-type system is also difficult to integrate into a restricted space.

Pad systems are useful for bracing the equipment in the cabin. Indeed, a pad system supporting an equipment can help offset the frequency of occurrence of an equipment vibration mode relative to the frequency of excitation. Pads also take up a non-negligible amount of space, which could prove prohibitive. In addition, the vibration damping effect of a resonator is greater than with a pad system.

Furthermore, document EP 0705950 B1 does not relate to the problem addressed by the invention in that it aims to produce a soundproof floor by means of a false floor with pads.

Likewise, document CA2914212 describes an impact damping mat.

Document U.S. Pat. No. 5,365,710 is also unrelated to the invention.

These documents EP 0705950, CA2914212 and U.S. Pat. No. 5,365,710 are therefore completely unrelated to the invention.

Document FR 2951698 describes a device for reducing the vibration from a main rotor of a rotary-wing aircraft. The device comprises a mount as well as a number of weighting elements and rollers. Each weighting element comprises two first openings facing two second openings on the mount. Each roller then passes through a first opening and a second opening.

Document FR 2795386 describes a vibratory suspension device with a torsion spring between a beater and a structure.

Document FR 2777860 describes a gearbox suspension device. The suspension device comprises levers. Each lever is hinged at the top of the gearbox as well as at an oblique bar and a pull bar.

Document CN 105972370 describes a bump leveler for piping. The bump leveler comprises a tethering ring connected to four weights.

BRIEF SUMMARY OF THE INVENTION

Indeed, the purpose of this invention is to offer a compact vibration damping device that is capable of, but not necessarily limited to, attenuating the vibrations sustained by a passenger's feet or by equipment on a shelf.

According to the invention, a vibration damping device is equipped with a resonator mechanism comprising at least one resonator, the at least one resonator having at least one beater. This at least one resonator comprises in particular a beater called a first beater extending from an end embedded at a free beating end. Optionally, the resonator may comprise at least one other beater.

This free end may comprise an integrated mass body or may be fitted with a removable mass body. Such a mass body may have a greater mass than the rest of the first beater. Such a mass body can also be adjustable and comprise one or more removable subsets.

In addition, the at least one resonator comprises a base, which may for example, but not exclusively, be H-shaped, the base being elastically deformable and equipped with a first branch and a second branch connected by a central section, the embedded end being embedded at the first branch, the first branch extending from a first end to a second end, each designed to be rigidly fastened to a mount, the second branch extending from a first end section to a second end section each designed to be rigidly fastened to a vibration source.

The vibration source can be a plate of the vibration damping device or be separate from the vibration damping device. For example, the vibration source can be a floor or shelf or wall, or can be attached to or even placed on a floor or shelf, or wall. The vibration source can be rigidly connected to the second branch of the resonator directly, optionally by welding or equivalent, or indirectly via rigid stringers or equivalent. For illustrative purposes, each end section is secured to a stringer screwed onto the vibration source.

Alternatively, or in a complementary fashion, the mount may be a tile on the vibration damping device or be separate from the vibration damping device. The mount can form a false floor, an equipment mount etc. The mount can be rigidly connected directly to the first resonator branch, optionally by welding or equivalent, or indirectly via rigid stringers or equivalent, for example. For illustrative purposes, each end is secured by a stringer that is screwed onto the mount.

Therefore, the vibration damping device can form a compact assembly to slide under an individual's feet or a piece of equipment. The mount can even form a cabin floor.

Aside from this aspect, the presence of an elastically deformable base allows each resonator of the vibration damping device to form a body known as a compliant mechanism, which is a mechanism without joints. Instead of pivots, the resonator has a first branch and a second branch, each of which is small in size compared to the other elements of the device, which then form deformation areas built into the material. For example, the center section and/or the first beater may be wider and/or thicker than the branches.

The first branch and the second branch of a resonator each form a torsion bar, i.e., an elastically deformable bar that can at least twist around the axes of these torsion bars. The first branch and the second branch act as joints, in particular, by being able to twist while nevertheless providing stiffness. One torsion bar is rigidly connected to the vibration source and the other torsion bar is rigidly connected to the mount which is to be at least partially isolated from the vibration source from a vibratory point of view. In addition, the base is attached to a first beater, which can be attached to this base or can form a monolithic assembly with the base.

The resonator is thus arranged at the interface between the vibration source and the mount to mitigate at least some of the vibrations emitted by the vibration source to limit transmission of these vibrations to the mount. When the vibration source vibrates, the first beater beats by elastically deforming the base, the free end of the first beater tending to make a substantially circular movement. The movement of the first beater is enabled by the elastic deformation of the central section and/or the base and, in particular, by the elastic deformation of the branches. Conventional pivot links are obtained not by pivots as such, but by deformation of the branches. The lever arm of the first beater enables the movement of the free end to be increased. The geometry of the resonator can be adapted to dissipate the vibrations at the desired anti-resonant frequency, such as the aforementioned primary frequency on a helicopter. For example, vibrations running in an orthogonal direction from the vibrating structure to the mount at the aforementioned primary frequency are dissipated upstream of the mount.

Such a mechanism enables the resonator to move freely in regard to the mount and vibration source without the use of joints that are subject to clearance and friction. On the other hand, the deformation areas of the first and second branches are subject to fatigue. In addition, the first branch and the second branch occasionally remain stiff.

These characteristics are nevertheless interesting in the case of a passive vibration damping device since on the one hand, the first beater tends to beat at a low angular amplitude, on the order of a few millimeters, and on the other hand the vibration damping device must be relatively stiff and provide little shock absorption.

The elimination of the pivots and use of deformable branches can help to achieve a resonator mechanism requiring little space, e.g. a resonator mechanism contained in a slab less than one centimeter thick. The mount and vibration source can also be thin.

The manufacturing costs of the resonator mechanism can be minimized, for example using low-cost manufacturing techniques such as laser cutting or 3D printing.

In addition, the absence of joints and therefore of wear parts may have multiple benefits, in particular a gain in mass, lower assembly cost, very low or no maintenance due to the passive nature of the vibration damping device, use at high temperatures which is difficult to achieve with elastomeric bearings, for example, etc.

Such a vibration damping device can be adapted to various applications. The number of resonators and the shape and size of each resonator can be specifically adapted as needed, according to the required size, the frequency of the vibrations to be mitigated, the weight the mount is capable of bearing, etc.

In particular, the vibration damping device can help reduce overall vertical vibration by supporting a complete floor.

However, the vibration damping device can be used in addition to known systems to locally mitigate vibrations, such as at a passenger's feet or near equipment. The small size of the vibration damping device can thus avoid obstructing the passenger's feet, e.g., in an emergency evacuation.

The vibration damping device may also comprise one or more of the following characteristics.

As the vibration damping device may comprise at least two of the said resonators, the two said resonators may be different.

For example, the vibration damping device may comprise several different resonators to filter vibrations at various frequencies.

Alternately or in a complementary fashion, as the vibration damping device may comprise at least two of the said resonators, both resonators may be identical.

For example, the resonator mechanism may comprise two pairs of resonators, the two resonators in each pair being identical, and the resonators of one pair being different from the resonators of the other pair. The resonator mechanism then comprises two types of resonators.

According to one embodiment, as the resonator mechanism may comprise at least one pair of two said resonators, the two resonators in one pair can be arranged in an inverse parallel configuration in one direction, with the free end of the first beater of a resonator in one pair being arranged according to the said direction between the base of that resonator and the free end of the first beater of the other resonator of that pair.

In one example, the resonator mechanism may comprise four resonators arranged in two rows. Each row comprises two resonators arranged in an inverse parallel configuration.

According to one embodiment, as the vibration damping device may comprise at least one pair of the said resonators, the first end and the second end of the first branch of one of the two resonators in a pair can be rigidly connected by two connecting stringers to the first end and to the second end of the first branch of the other resonator in that pair, respectively, at least one of the two said connecting stringers having at least one fastener to rigidly attach it to said mount.

The pair of two resonators may comprise at least one cross stringer connecting said two connecting stringers, with the said at least one cross stringer able to extend between the two resonators of the said pair.

At least one fastener may be a hole in a connecting stringer or cross stringer, with a screw or equivalent passing through this hole to secure the resonator mechanism to the mount.

The connecting stringers and cross stringers may be stiffer than the branches such that the movement of the first beater deforms the branches and not the connecting and cross stringers. For example, the connecting stringers and the cross stringer may be wider and/or thicker than the branches.

The connecting stringers may optionally be parallel between each other and orthogonal to each cross stringer.

According to one embodiment, as the vibration damping device may comprise two or more pairs of two resonators, one connecting stringer can be common to both pairs of two resonators.

"A connecting stringer can be common" means that one connecting stringer is rigidly connected to the first branch of four resonators. The common connecting stringer is in effect rigidly connected to the first branch of a first resonator, to the first branch of a second resonator of a first pair formed with the first resonator, to the first branch of a third resonator of a second pair arranged next to and thus adjacent to the first resonator and to the first branch of a fourth resonator arranged next to and adjacent to the second resonator.

Optionally, the first two branches of two adjacent resonators are aligned.

According to one embodiment, as the vibration damping device may comprise at least one pair of the said resonators, the first end section of the second branch of a resonator in the said pair may be rigidly connected by a link bar to the first end section of the second branch of the other resonator in that pair, the second end section of the second branch of a resonator in the said pair being rigidly connected by a link bar to the second end section of the second branch of the other resonator in that pair or to the second end section of the second branch of a resonator in another pair.

Each link bar can be stiffer than the branches such that the movement of the first beater deforms the branches and not the link bars. For example, each link bar may be wider and/or thicker than the branches.

Moments can be exerted on the ends of the first branches and the end sections of the second branches. To remedy this, two resonators can be arranged in an inverse parallel configuration and/or be connected by the connecting stringers or the link bars.

According to one embodiment, the vibration damping device may comprise at least one stop to limit the beat of the said first beater, or of a second beater, if any.

For example, a mechanical stop may be a stud attached to the vibration source or to another element to block and thus limit the movement of one or more beaters or of the mount to prevent plastic deformation of the resonator base.

For example, the vibration damping device can be sized to bear a weight of 20 kilograms to support the feet of an individual sitting on a seat. However, this individual may temporarily stand on the mount. In this case, each stop limits the sinkage of the mount towards the vibration source. The stop is inoperative when the individual is sitting on a seat.

According to one embodiment, the vibration damping device may comprise at least one spacer to prevent contact between the said mount and the first beater or each beater or between the first beater or each beater and the vibration source.

Such a spacer may be in the shape of a wedge, optionally in stainless steel, and attached for example to a connecting stringer, having a raised surface above the connecting stringer as appropriate, or a raised surface above the mount or the vibration surface.

The spacer(s) enable(s) a clearance to be created between each resonator and the mount or vibration source to allow for the deformation of each resonator.

According to one embodiment, the resonator mechanism may form a monolithic assembly.

Manufacturing such a set can be facilitated and performed at a reduced cost.

According to one embodiment, the resonator mechanism may be flat if there is no deformation of the first beater or even of each beater, the said resonator mechanism having a consistent thickness.

According to one embodiment, as the vibration damping device may comprise the mount, the mount may comprise at least one opening facing the said free end.

Such an opening in the mount can make it easier for the related beater to beat without interference.

According to one embodiment, the vibration damping device comprising the said vibration source, the said vibration source comprises at least one cut facing the said free end.

Such a cut in the vibration source can make it easier for the related beater to beat without interference.

According to one embodiment, the first branch and the said second branch of a said resonator may be different or identical.

According to another embodiment, a resonator may comprise a second beater, the second beater extending from an embedded area to a free beating area, the said embedded area being embedded in the second branch.

In addition to a vibration damping device, the invention may comprise a vehicle equipped with such a vibration damping device.

This vehicle may be an aircraft, e.g. a rotary-wing aircraft. The vehicle can also be a car, a ship, a train, etc. The vehicle can be motorized or not.

For example, the seats in the cabin are equipped with passive devices according to the prior art. In addition, a portion of the floor intended to accommodate the passengers' feet may comprise vibration damping devices according to the invention.

In another example, the floor is made with a vibration damping device according to the invention.

Each vibration damping device can be made to filter vibrations along a perpendicular axis to a plane containing the branches of each resonator or along other axes.

In one example, a vibration damping device according to the invention rests on a shelf for holding equipment.

In another example, a vibration damping device according to the invention can be used to mitigate vibration, for example at the aforementioned primary frequency of a rotary-wing aircraft, but also at frequencies proportional to that aforementioned primary frequency.

BRIEF DESCRIPTION OF THE DRAWINGS

The invention and its benefits will be shown in more detail in the following description with illustrative examples given in reference to annexed figures, which represent.

Items shown in several separate figures are assigned with one reference.

Three directions X, Y and Z orthogonal to each other are shown in some figures.

DETAILED DESCRIPTION OF THE INVENTION

Figure 1:
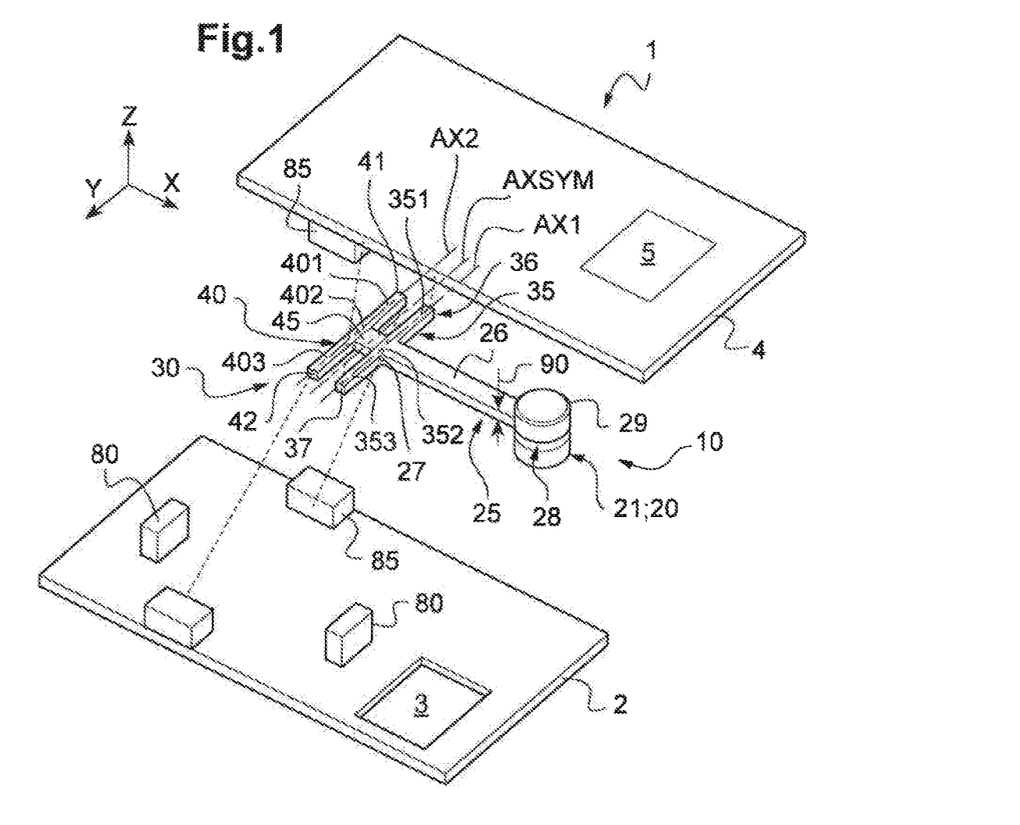
FIG. 1, an exploded view of a vibration damping device with one resonator.

FIG. 1 shows a vibration damping device 1 according to the invention.

This vibration damping device 1 is equipped with a resonator mechanism 10 optionally monolithic. The resonator mechanism 10 comprises one or more resonators 20, and more precisely a single resonator 21 according to the non-restrictive example in FIG. 1.

Regardless of the number of resonators, each resonator comprises at least one beater and therefore a first beater 25 capable of performing, after a vibratory excitement, a beating motion in particular around a first rotation axis AX1. The first beater 25 has an arm 26 that extends in a longitudinal direction from an embedded end 27 to a free end 28. This free end 28 may bear a mass body 29. This mass body 29 may be built in or may be removable in whole or in part. For example, the mass body may comprise several masses stacked on each other. The mass body 29 and arm 26 can form a monolithic assembly. The mass body 29 may protrude above the arm.

In addition, the resonator 21 has an elastically deformable base 30. This base thus has an elastically deformable first branch 35 and an elastically deformable second branch 40 connected by an elastically deformable center section 45. The embedded end 27 of the first beater is thus embedded in the first branch 35.

The base 30 and at least the arm of the first beater 25 can form a monolithic assembly of a single flat unit, i.e., having a thickness 90 that is consistent between one face facing a mount 4 and one face facing a vibration source 2 as described later. Optionally, only the mass body has a raised surface compared to the rest of the mechanism According to one embodiment, the first branch 35 may be in the shape of a slab or a more complex shape, e.g. a "U" shape.

The first branch 35 extends according to its length along a first rotation axis AX1 from a first end 36 to a second end 37. Thus, the first branch 35 may include a first section 351 comprising the first end 36 extended by a second section 352 secured to the first beater 25, the second section 352 being itself extended by a third section 353 comprising the second end 37.

The first branch 35, in particular the first section 351 and the third section 353 are at least elastically deformable in rotation around the first rotation axis AX1.

The second branch 40 can be a more complex slab or shape. The second branch extends according to its length along a second rotation axis AX2 from a first end section 41 to a second end section 42. Thus, the second branch may comprise a first part 401 comprising the first end section 41 extended by a second part 402, the second part 402 being itself extended by a third part 403 comprising the second end section 42.

The second branch 40, and in particular the first part 401 as well as the third part 403 are at least elastically deformable around the second rotation axis AX2.

The central section 45 is attached to the first branch and to the second branch to move them away from each other in the longitudinal direction. Optionally, the central section 45 is attached to the second section 352 and to the second part 402. The central section 45 can be a more complex slab or shape.

The first branch 35 and the second branch 40 can be identical. Alternatively, the first branch 35 and the second branch 40 can be completely different or partially different, with, in particular, different lengths depending on their rotation axes AX1, AX2, or different cuts in perpendicular planes to their transverse directions.

According to one embodiment, the first branch 35 and the second branch 40 can be parallel to each other.

Optionally, the first branch 35 and the second branch 40 can be arranged symmetrically on either side of a symmetrical axis AXSYM passing through the central section.

Seen from above along the substantially octagonal raised axis Z in the resting longitudinal direction, the base shown in the example is in the shape of an H. More complex shapes are possible based on the shape of the first branch and/or the second branch.

According to another embodiment, the first end and the second end are designed to be directly or indirectly fastened to a mount 4. The mount 4 may comprise an opening 5, i.e. an opening/window, facing each beater, in particular the free end 28 of the first beater of each resonator.

Additionally, the first end section 41 and the second end section 42 are designed to be directly or indirectly fastened to a vibration source 2. The vibration source 2 may comprise a cut 3 facing the free end 28 of each resonator.

Optionally, the mount 4 and/or vibration source 2 form parts of the vibration damping device 1. The mount 4 and/or the vibration source 2 can be made from composite materials for minimal thickness, this minimal thickness being optionally less than that of the resonator mechanism.

According to one embodiment, the vibration damping device 1 may comprise at least one stop 80 to limit the beat of the beater(s). According to the example in FIG. 1, a stop can be a buffer, for example arranged on the vibration source 2 or separate from that vibration source.

According to one embodiment, the vibration damping device 1 may comprise at least one spacer 85. Each spacer can help create a clearance between a resonator and the mount or the vibration source.

According to the embodiment shown in FIG. 1, the vibration damping device 1 may comprise a single resonator.

According to other embodiments, the vibration damping device may comprise several resonators, optionally identical or different, two resonators optionally forming a particular resonator pair.

Figure 2:
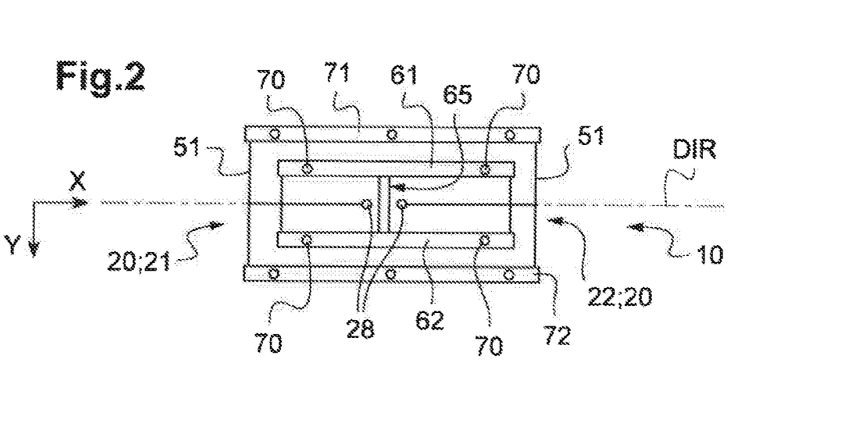
FIG. 2, a top view of a resonator mechanism having two resonators.

Thus, as shown in FIG. 2 the vibration damping device 1 may comprise a single pair 51 of resonators 21, 22.

The first resonator 21 and the second resonator 22 in a pair 51 can be arranged in an inverse parallel configuration in the direction DIR. Therefore, the free end of the first beater of the first resonator 21 is arranged according to the direction DIR between the base of this first resonator 21 and the free end of the first beater of the second resonator 22 of that pair 51. The first beaters of the two resonators can be aligned.

Additionally, the first end and the second end of the first branch of the first resonator 21 can be rigidly connected, respectively, by two connecting stringers 61, 62 to the first end and to the second end of the first branch of the second resonator 22. Optionally, one or more cross stringers 65 connect the two connecting stringers 61, 62 for example by extending between the two resonators 21, 22. The first branch and the second branch of the first resonator can be parallel to the first branch and the second branch of the second resonator.

In addition, at least one of the connecting stringers 61, 62 is equipped with at least one fastener 70. Such a fastener may be a fastening hole. Optionally, a wedge spacer is attached to the top face of each connecting stringer, with such a top face facing the mount. Such a spacer may be glued and/or screwed onto the connecting stringer and/or the mount.

Likewise, the first end section of the second branch of the first resonator 21 is rigidly connected by a link bar 71 to the first end section of the second branch of the second resonator 22.

In this dual-resonator configuration, the second end section of the second branch of the first resonator of the said pair 51 can be rigidly connected by a link bar 72 to the second end section of the second branch of the second resonator 22. Optionally, a wedge spacer is attached to the bottom face of each link bar, with such a bottom face facing the vibration source. Such a spacer may be glued and/or screwed to the link bar and/or the vibration source.

FIG. 2 shows that the resonator mechanism 10 can form a monolithic assembly. In addition, the resonator mechanism 10 is flat when the beater(s) is (are) not beating, the resonator mechanism 10 having a consistent thickness 90 with the possible exception of each mass body.

Figure 3:
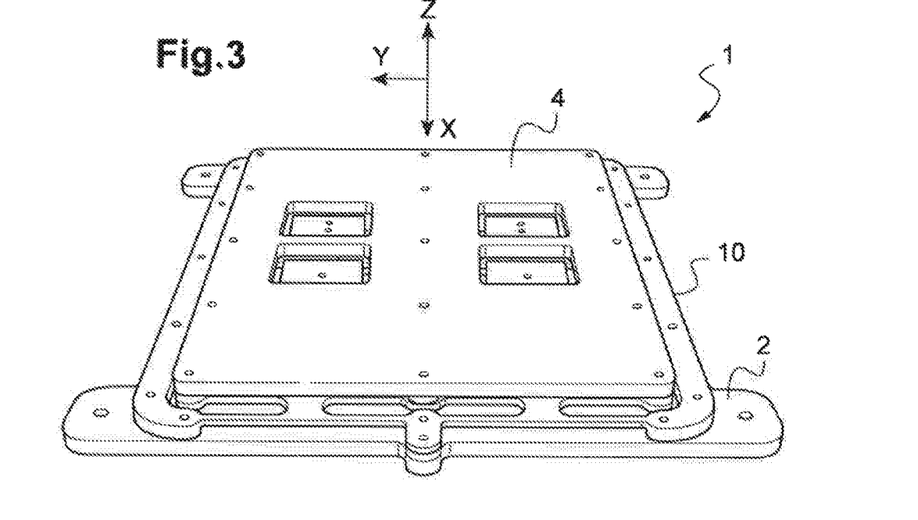
FIG. 3 and FIG. 4, three-dimensional views of a vibration damping device.
Figure 4:
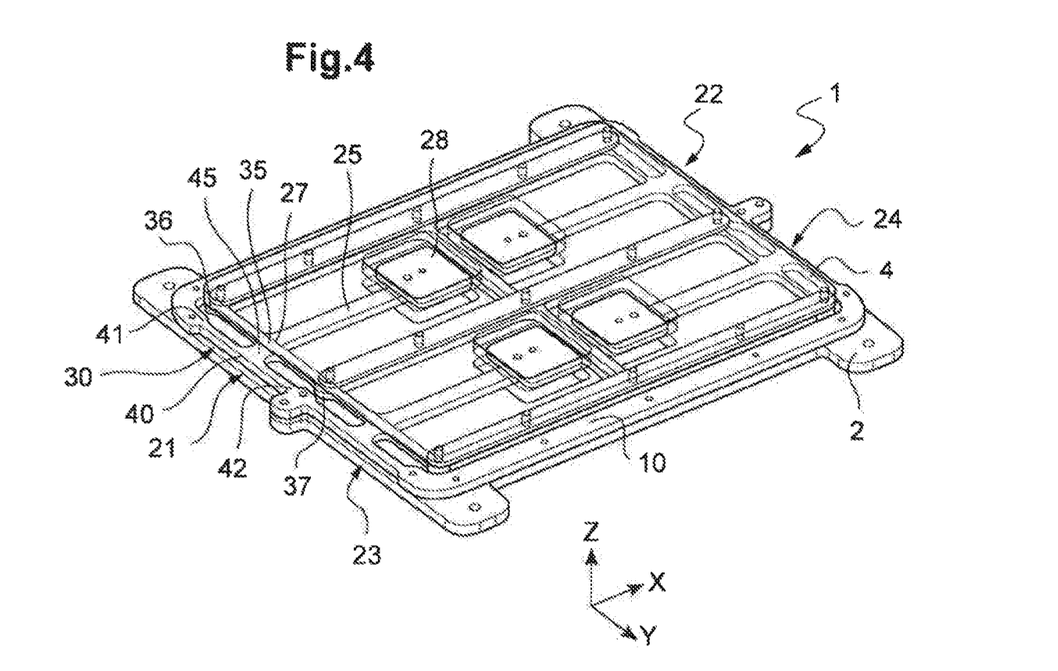

According to FIGS. 3 and 4, the vibration damping device 1 may comprise two pairs of resonators 21-22, 23-24. In FIG. 4, the mount 4 is transparent to show the resonators.

Like the mechanism in FIG. 2, the resonator mechanism 10 can form a monolithic assembly. In addition, the resonator mechanism 10 is flat when the beater(s) is (are) not beating, the resonator mechanism 10 having a consistent thickness 90. Only the mass bodies protrude above this consistently thick portion.

Figure 5:
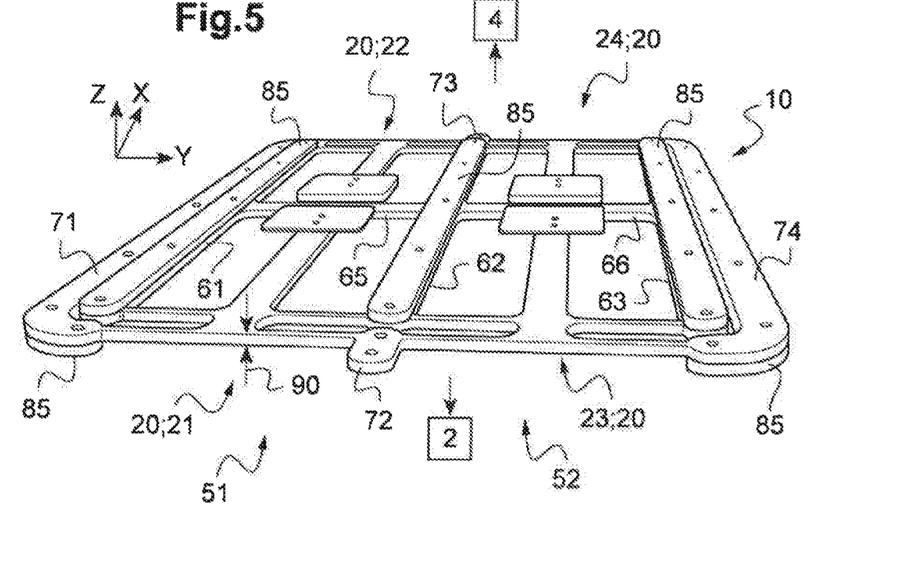
FIG. 5, a three-dimensional view showing in particular the resonator mechanism of the vibration damping device in FIGS. 3 and 4, FIGS. 6 and 7, views of a resonator having a first beater and a second beater.

FIG. 5 shows the resonator mechanism 10 of this vibration damping device.

As in FIG. 2, the two resonators 21-22, 23-24 in each pair can be arranged in an inverse parallel configuration.

In addition, each pair may comprise two connecting stringers 61-62, 62-63. However, a stringer may be common to both pairs.

Thus, a first connecting stringer 61 can connect the first end of the first branch of a first resonator 21 in a first pair to the first end of the first branch of the second resonator 22 in that first pair.

A third connecting stringer 63 can connect the first end of the first branch of a third resonator 23 in a second pair to the first end of the first branch of the fourth resonator 24 in that second pair.

Additionally, a second connecting stringer can connect the second end of the first branch of the third resonator 23, the second end of the first branch of the fourth resonator 24, the second end of the first branch of the first resonator 21, and the second end of the first branch of the second resonator 22.

Each connecting stringer can carry a spacer 85, for example a wedge.

Optionally, the first branch of the first resonator and the first branch of the third resonator are aligned. Likewise, the first branch of the second resonator and the first branch of the fourth resonator can be aligned.

According to one embodiment, a first link bar 71 can connect the first end section of the second branch of a first resonator 21 in a first pair to the first end section of the second branch of the second resonator 22 in that first pair.

A fourth link bar 74 can connect the first end section of the second branch of a third resonator 23 in a second pair to the first end section of the second branch of the fourth resonator 24 in that second pair.

Additionally, a second link bar 72 can connect the second end section of the second branch of the third resonator 23 to the second end section of the second branch to the first resonator 21. A third link bar 73 can connect the second end section of the second branch of the second resonator 22 to the second end section of the second branch of the fourth resonator 24.

Each link bar can carry a spacer 85, for example a wedge.

Optionally, the second branch of the first resonator and the second branch of the third resonator are aligned. Likewise, the second branch of the second resonator and the second branch of the fourth resonator can be aligned.

FIGS. 1 through 5 illustrate resonators comprising a single beater.

Figure 6:
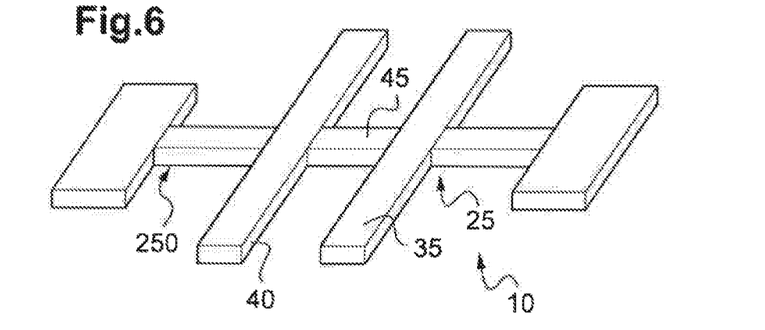

However, according to the embodiment shown in FIG. 6, a resonator may comprise a second beater 250. This second beater 250 extends from an embedded area to a free beating area, the embedded area of the second beater being embedded in the second branch 40. The second beater may comprise one or more of the characteristics of the first beater described previously. The second beater can be fitted in line with the first beater.

Figure 7:
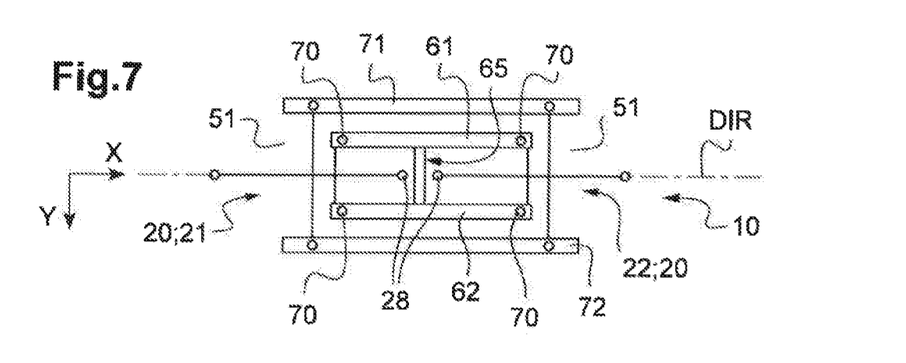

As shown in FIG. 7, a pair of resonators may comprise one or two resonators equipped with a second beater as shown in FIG. 6.

Figure 8:
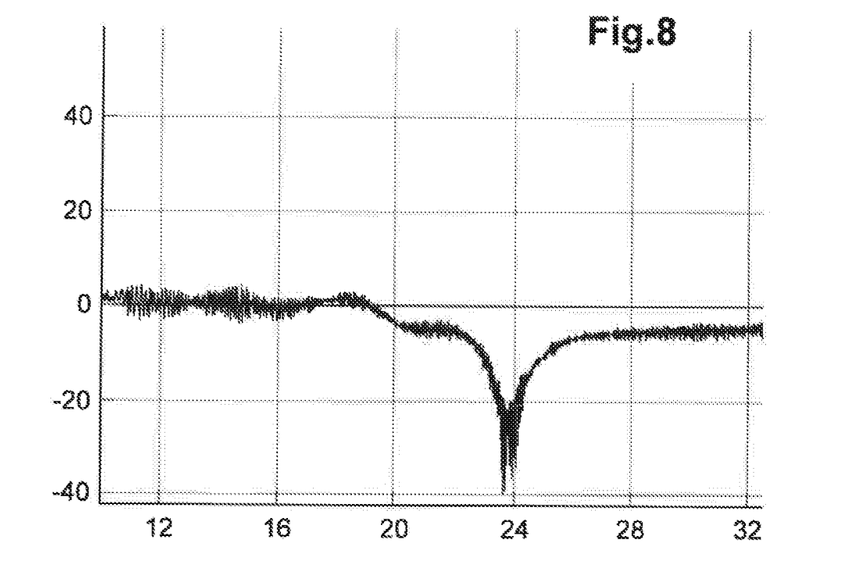
FIG. 8, a diagram illustrating the operation of the vibration damping device according to FIGS. 3 and 4, and FIGS. 9 through 11, diagrams illustrating possible uses of the invention.

FIG. 8 shows a diagram illustrating the operation of a vibration damping device according to FIG. 3. The resonator mechanism has a thickness of five millimeters, which enables it to be cut from an aluminum plate 2017 using a more cost-effective water-jet cutting method. Each branch is in the shape of a tile five millimeters wide and fifty millimeters long. Each first beater carries a 150-gram weight sized to filter vibrations occurring at 25 Hz. Stiffness is approximately 20 daN/mm with static stress of approximately 140 MPa (MegaPascals) and a mass of 20 kg.

The diagram in FIG. 8 illustrates the antiresonance obtained at around 25 Hz when a 100-kilogram person sits on a seat and places his/her feet on a vibration damping device according to the invention. This diagram shows a ratio of the vibration amplitude in decibels of the source to the vibration amplitude of the mount as a function of the frequencies in Hertz.

Figure 9:
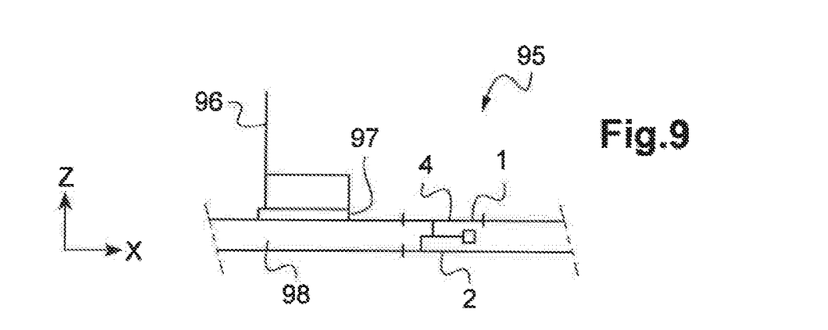
Figure 10:
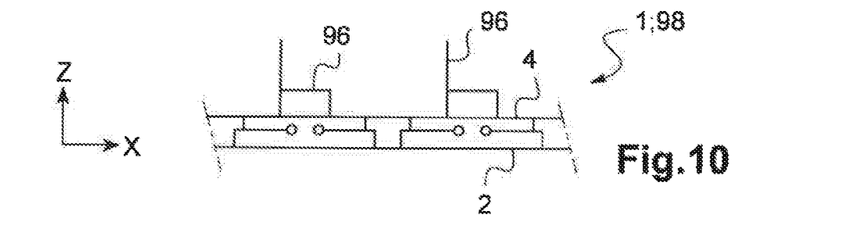
Figure 11:
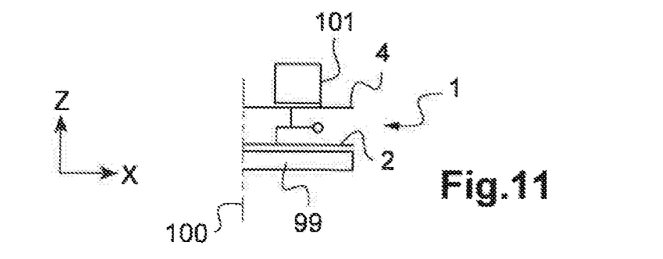

FIGS. 9 through 11 illustrate various possible uses of the invention, particularly in a vehicle.

According to FIG. 9, a cabin in a vehicle 95 may comprise a seat 96 attached to a floor 98 by a seat vibration damping system 97, for example of the type disclosed in patent FR 2951700. Optionally, a portion of the floor theoretically located under the feet of an individual sitting on this seat is replaced by a vibration damping device according to the invention. The mount 4 can be arranged in line with the top side of the floor.

According to FIG. 10, the entire floor can be replaced by a vibration damping device according to the invention. The vibration damping systems 97 in FIG. 7 may optionally be omitted.

According to FIG. 11, a vibration damping device according to the invention is placed on a shelf 99 attached to a wall 100. Some equipment 101 can then be placed on the support 4.

Of course, this invention is subject to a wide variety of uses. Although several embodiments have been described, it is understood that it is impossible to fully identify all possible modes. It is of course possible to replace a means described by an equivalent means without departing from the context of this invention.

What is claimed is:

1. A vibration damping device comprising:
   a resonator mechanism including at least one resonator, the at least one resonator including at least one beater having a first beater extending from an embedded end to a beating free end, the at least one resonator further including an elastically deformable base,
   wherein the base includes a first branch, a second branch, and a central section, the embedded end being embedded in the first branch, the first branch extending from a first end to an intermediate portion to a second end, each of the first end and the second end being rigidly fastenable to a mount, the second branch extending from a first end section to an intermediate section to a second end section, each of the first end section and the second end section being rigidly fastenable to a vibration source, the first branch and the second branch being connected together by the central section being directly connected between the intermediate portion of the first branch and the intermediate section of the second branch with none of the ends of the first branch being directly connected to any of the end sections of the second branch.

2. The vibration damping device according to claim 1, wherein the at least one resonator comprises at least two resonators, the at least two resonators are different.

3. The vibration damping device according to claim 1, wherein the resonator mechanism includes at least one pair of two resonators, the two resonators in a first pair of the at least one pair of two resonators being arranged in an inverse parallel configuration, the free end of the first beater of a first one of the two resonators in the first pair being arranged between the base of the first one of the two resonators and the free end of the first beater of a second one of the two resonators in the first pair.

4. The vibration damping device according to claim 1, wherein the resonator mechanism includes at least one pair of two resonators, the first end and the second end of the first branch of a first one of the two resonators in a first pair of the at least one pair of two resonators being respectively rigidly connected by two connecting stringers to the first end and to the second end of the first branch of a second one of the two resonators in the first pair, a first one of the two connecting stringers having at least one fastener for rigidly fastening the first ends of the two resonators in the first pair to the mount.

5. The vibration damping device according to claim 4, wherein the resonator mechanism includes at least two pairs of two resonators, a connecting stringer is common to the two pairs of two resonators.

6. The vibration damping device according to claim 1, wherein resonator mechanism includes at least one pair of two resonators, the first end section of the second branch of a first one of the two resonators in a first pair of the at least one pair of two resonators being rigidly fastened by a first link bar to the first end section of the second branch of a second one of the two resonators in the first pair, the second end section of the second branch of the first one of the two resonators in the first pair being rigidly connected by a second link bar either to the second end section of the second branch of the second one of the two resonators in the pair or to the second end section of the second branch of a resonator other than the two resonators in the first pair.

7. The vibration damping device according to claim 1, wherein the vibration damping device further comprises at least one stop to limit the beating of the first beater.

8. The vibration damping device according to claim 1, wherein the vibration damping device further comprises at least one spacer to prevent contact between the mount and the first beater or between the first beater and the vibration source.

9. The vibration damping device according to claim 1, wherein the resonator mechanism forms a monolithic assembly.

10. The vibration damping device according to claim 1, wherein the first beater and the base of the resonator mechanism are flat when there is no deformation of the first beater, the first beater and the base of the resonator mechanism having a consistent thickness.

11. The vibration damping device according to claim 1, wherein the first branch and the second branch of the resonator are different.

12. The vibration damping device according to claim 1, wherein the base is in the shape of an H.

13. The vibration damping device according to claim 1, wherein the at least one resonator further includes a second beater, the second beater extending from an embedded area to a free beating area, the embedded area being embedded in the second branch of the base of the at least one resonator.

14. The vibration damping device according to claim 1, wherein the first branch and the second branch of the resonator are identical.

15. A vibration damping device for mitigating vibrations emitted by a vibration source to limit transmission of the vibrations to a mount that is spaced apart from the vibration source along a vertical axis, the vibration damping device comprising:
   a resonator mechanism having a resonator, the resonator including a first beater extending from an embedded end to a beating free end; and
   the resonator further including an elastically deformable base having a first branch, a second branch, and a central section, the embedded end being embedded in the first branch, the first branch extending from a first end to an intermediate portion to a second end, each of the first end and the second end being rigidly fastened to the mount, the second branch extending from a first end section to an intermediate section to a second end section, each of the first end section and the second end section being rigidly fastened to the vibration source, the first branch and the second branch being connected together by the central section being directly connected between the intermediate portion of the first branch and the intermediate section of the second branch with none of the ends of the first branch being directly connected to any of the end sections of the second branch.

16. The vibration damping device according to claim 15, wherein the mount includes an opening facing the free end and the vibration source includes a cut facing the free end.

17. The vibration damping device according to claim 15, wherein the vibration damping device further includes at least one spacer to prevent contact between the mount and the first beater or between the first beater and the vibration source.

18. The vibration damping device according to claim 15, wherein the resonator mechanism is arranged at an interface between the mount and the vibration source with the base including the first branch, the second branch, and the central section being arranged on a plane normal to the vertical axis.

19. A vibration damping device for mitigating vibrations emitted by a vibration source to limit transmission of the vibrations to a mount that is spaced apart from the vibration source along a vertical axis, the vibration damping device comprising:

a resonator mechanism arranged at an interface between the mount and the vibration source, the resonator mechanism having a resonator including a first beater extending from an embedded end to a beating free end;

the resonator further including an elastically deformable base having a first branch and a second branch connected by a central section, the base including the first branch, the second branch, and the central section being arranged on a plane normal to the vertical axis, the embedded end being embedded in the first branch, the first branch extending from a first end to an intermediate portion to a second end, each of the first end and the second end being rigidly fastened to the mount, the second branch extending from a first end section to an intermediate section to a second end section, each of the first end section and the second end section being rigidly fastened to the vibration source.

20. The vibration damping device according to claim 19, wherein the base is in the shape of an H.

* * * * *